(12) United States Patent
Lim et al.

(10) Patent No.: US 7,099,987 B2
(45) Date of Patent: Aug. 29, 2006

(54) MOBILE TERMINAL HAVING A SWITCHING FUNCTION

(75) Inventors: Hun Il Lim, Kyoungki-do (KR); Hyun Duk Roh, Kyoungki-do (KR); Dong Uk Min, Kyoungki-do (KR)

(73) Assignee: Curitel Communications, Inc., (KR)

( * ) Notice: Subject to any disclaimer, the term of this patent is extended or adjusted under 35 U.S.C. 154(b) by 260 days.

(21) Appl. No.: 10/761,588

(22) Filed: Jan. 20, 2004

(65) Prior Publication Data

US 2004/0177207 A1    Sep. 9, 2004

(30) Foreign Application Priority Data

Jan. 21, 2003    (KR) .................. 10-2003-0003894

(51) Int. Cl.
  *G06F 13/00*  (2006.01)
  *G06F 3/00*   (2006.01)
  *G06F 3/02*   (2006.01)

(52) U.S. Cl. .................. 710/316; 710/8; 710/14; 710/38; 710/62

(58) Field of Classification Search ............ 710/8, 710/29, 38, 62, 72, 316
  See application file for complete search history.

(56) References Cited

U.S. PATENT DOCUMENTS

| | | | |
|---|---|---|---|
| 6,549,958 B1 * | 4/2003 | Kuba .................. | 710/14 |
| 2001/0009439 A1 * | 7/2001 | Hwang ................. | 348/232 |
| 2001/0045988 A1 * | 11/2001 | Yamauchi et al. ....... | 348/273 |
| 2002/0018138 A1 * | 2/2002 | Yoshiro ............... | 348/333.05 |
| 2002/0097323 A1 * | 7/2002 | Ito ................... | 348/207 |
| 2002/0101515 A1 * | 8/2002 | Yoshida et al. ........ | 348/211 |
| 2002/0154224 A1 | 10/2002 | Yoneda | |
| 2002/0194414 A1 * | 12/2002 | Bateman et al. ........ | 710/303 |
| 2003/0149816 A1 * | 8/2003 | Poo et al. ............ | 710/62 |
| 2003/0162445 A1 | 8/2003 | Fujita et al. | |

FOREIGN PATENT DOCUMENTS

| | | |
|---|---|---|
| EP | 0 963 100 | 6/1999 |
| JP | 63-120869 | 5/1988 |
| JP | 07-311249 | 11/1995 |
| JP | 2000-124493 | 4/2000 |
| JP | 2000196986 | 7/2000 |
| JP | 2001-306495 | 11/2001 |
| KR | 1993-0016893 | 8/1993 |
| KR | 1996-0020102 | 6/1996 |
| KR | 1020000002137 | 1/2000 |
| KR | 1020010019600 | 4/2001 |
| KR | 1020010020612 | 4/2001 |

(Continued)

*Primary Examiner*—Kim Huynh
*Assistant Examiner*—Scott Sun
(74) *Attorney, Agent, or Firm*—Blakely Sokoloff Taylor & Zafman

(57) ABSTRACT

The present invention provides an interface device using a function of switch that can execute various applications in a mobile terminal by multi-switching USB_D+ and USB_D−, or RS232C data line to an external interface; and, particularly, that can make the mobile terminal used as a PC camera. A universal serial bus (USB) interface device using function of switch includes a dual interface unit for multi-switching data according to a microcontroller unit (MCU) selection signal and a digital signal processor (DSP) selection signal; an image processing unit for digitalizing the image data; a signal processing unit for activating the MCU selection signal or the DSP selection signal, and processing the data; and a memory unit for saving the data according to control of the image processing unit or the signal processing unit.

10 Claims, 2 Drawing Sheets

FOREIGN PATENT DOCUMENTS

| | | | | | |
|---|---|---|---|---|---|
| KR | 2001-73533 | 8/2001 | WO | WO 02/101640 | 12/2002 |

* cited by examiner

MOBILE TERMINAL HAVING A SWITCHING FUNCTION

FIELD OF THE INVENTION

The present invention relates to a mobile terminal having a switching function; and, more particularly, to a mobile terminal that interfaces with various external devices via a universal serial bus (USB).

RELATED ART OF THE INVENTION

FIG. 1 is a block diagram showing a conventional universal serial bus (USB) interface device.

The prior USB interface device includes a personal computer 110 for providing image data, melody and text data, e.g., address list, a USB transceiver 120 for interfacing an external device and a mobile terminal, a microcontroller unit (MCU) 130 for transforming data of the mobile terminal into data that is adequate for USB transceiver 120 and a memory 140 for storing the data from the MCU 130 and outputting the stored data according to control of the MCU 130.

Although the conventional USB interface device implements the USB transceiver so as to send and receive image data, melody and text data to an external unit including PC, the conventional USB interface device does not interface a digital camera unit which is built in the current mobile terminals.

SUMMARY OF THE INVENTION

It is an object of the present invention to provide a mobile terminal having a switching function that can execute various applications in the mobile terminal by multi-switching USB_D+ and USB_D−, or RS232C data line to an external interface; and, particularly, that can make the mobile terminal used as a camera module for a personal computer and other applications, e.g., a printer, an external USB memory, a keyboard and an audio component.

In accordance with one aspect of the present invention, there is provided a mobile terminal having a switching function, includes a dual interface unit for connecting to an external device through a communication line and multi-switching data according to a microcontroller unit (MCU) selection signal and a digital signal processor (DSP) selection signal; an image processing unit for obtaining external image data, digitalizing the image data and outputting the digitalized data to the dual interface unit; a signal processing unit for activating the MCU selection signal or the DSP selection signal, sending the data to the external device through the dual interface unit, receiving the data from the external device through the dual interface unit and processing the data; and a memory unit for saving the data according to control of the image processing unit or the signal processing unit and out putting the data.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Figure 1:
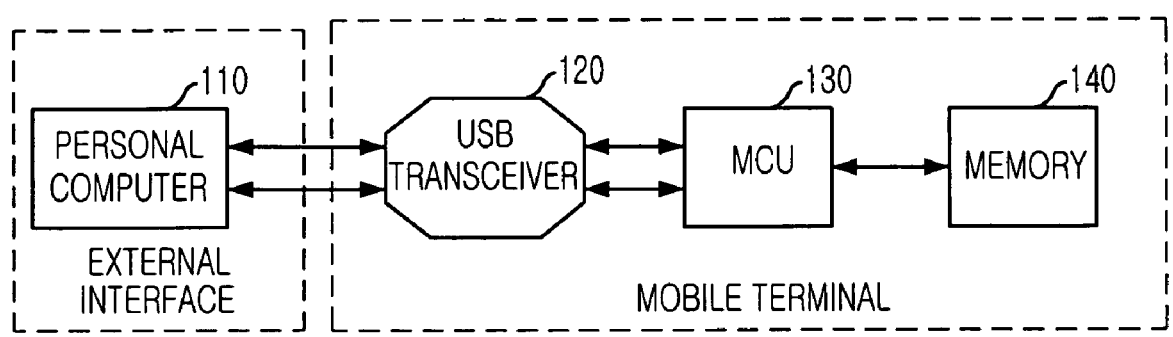
FIG. 1 is a block diagram showing a conventional universal serial bus (USB) interface device.
Figure 2:
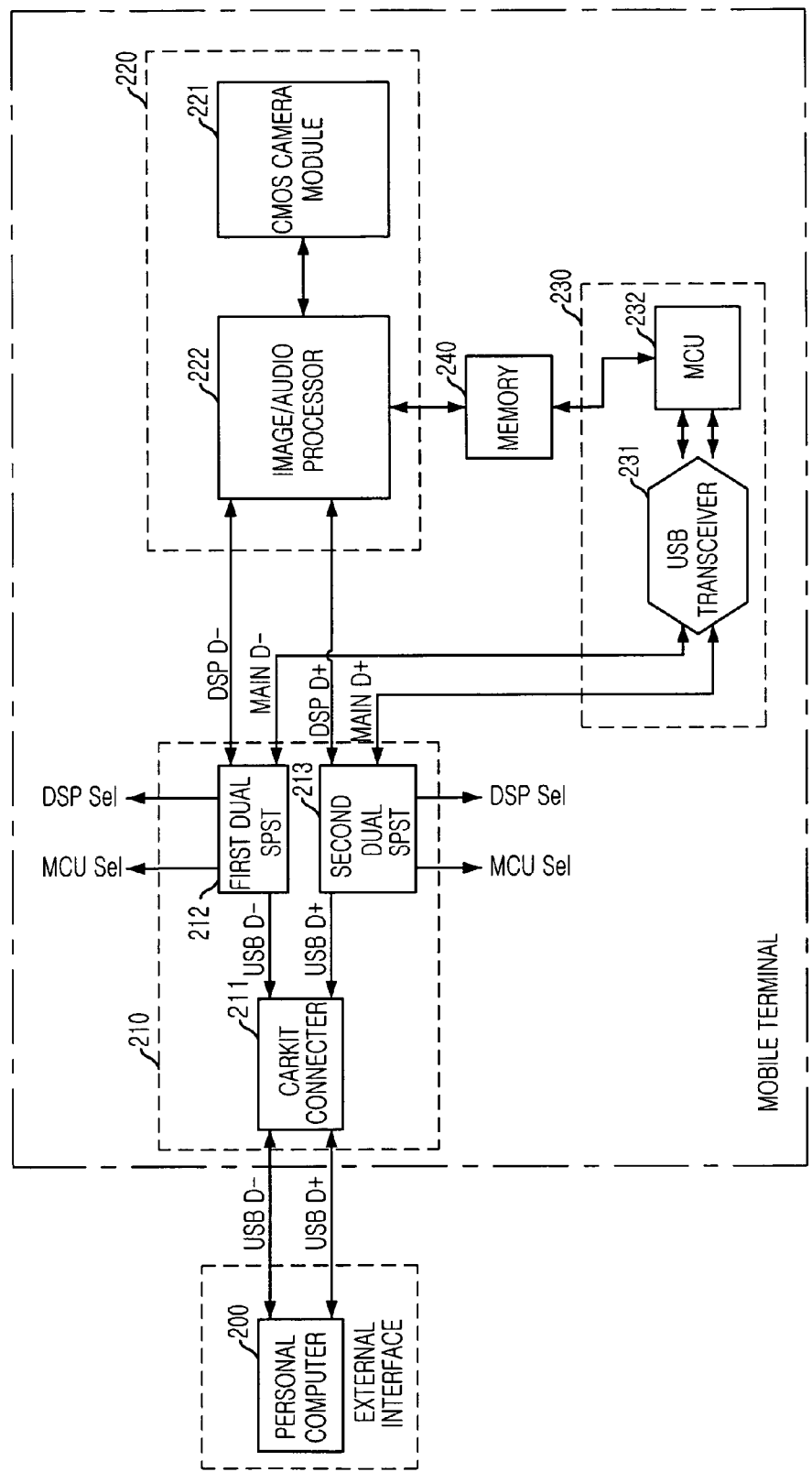
FIG. 2 is a block diagram showing a mobile terminal; having a switching function in accordance with an embodiment of the present invention.

FIG. 2 is a block diagram showing a mobile terminal having a switching function in accordance with an embodiment of the present invention.

The mobile terminal of the present invention includes a dual interface unit 210, an image processing unit 220, a signal processing unit 230 and a memory unit 240.

A personal computer 200 receives data from the mobile terminal or provides data to the mobile terminal through USB lines, e.g., USB D− and USB D+.

The personal computer 200 is used as an external device in the embodiment of the present invention. However, devices which can function as a USB master, e.g., a printer, an external USB memory, a USB keyboard and an audio component, can be applied. Also, instead of USB line, RS232C data lines can be used to connect the external device to the mobile terminal.

The dual interface unit 210 is connected to a communication line, e.g., a USB line or a RS232C, and executes multiple switching operations according to a MCU selection signal and a DSP selection signal. The MCU selection signal and the DSP selection signal are general purpose input/output (GPIO) instructions of MCU 232.

A connector 211 in the dual interface unit 210 is connected to the communication line and provides interface. The communication line includes a first USB line (USB D−) and a a second USB line (USB D+).

A first dual single pole single throw (SPST) 212 in the dual interface unit 210, is connected to the first USB line, USB D−, through the connecter 211, provides a data path to the signal processing unit 230 when the MCU selection signal is activated, and provides a data path to the image processing unit 220 when the DSP selection signal is activated. The first dual SPST 212 is open when both of the MCU selection signal and the DSP selection signal are not activated.

A second dual SPST 213 in the dual interface unit 210, is connected to the second USB line, USB D+, through the connecter 211, provides a data path to the signal processing unit 230 when the MCU selection signal is activated, and provides a data path to the image processing unit 220 when the DSP selection signal is activated. The second dual SPST 213 is open when both of the MCU selection signal and the DSP selection signal are not activated.

The image processing unit 220, obtains external image or audio data as well as the image, digitalizes the data and outputs the digitalized data through the dual interface unit 210.

The image processing unit 220 includes a complementary metal oxide semiconductor (CMOS) or a charge-coupled device (CCD) camera module 221 and an image processor 222.

The camera module 221 obtains external image data and outputs the image data.

The image processor 222 receives the image data from the camera module 221, processes the image data only or the audio data as well as the image data and outputs the processed data to the dual interface unit 210. The image processor 222 also displays the image data on a liquid crystal display (LCD) (not shown).

The signal processing unit 230 activates the DSP selection signal and the MCU selection signal, receives the data from the dual interface unit 210 and processes the data.

The signal processing unit 230 includes a USB transceiver 231 and a MCU 232.

The USB transceiver 231 receives the data from the dual interface unit 210, transforms the data into a logic level signal and transmits the data from the MCU 232 to the dual interface unit 210.

The MCU 232 receives the data from the USB transceiver 231, transforms the data into an adequate format for the mobile terminal, transforms the data from the mobile terminal into an adequate format for the USB transceiver 231 and activates the DSP selection signal or the MCU selection signal.

The memory unit 240 stores or outputs data according to control of the signal processing unit 230.

When the MCU selection signal is activated, the first dual SPST 212 and the second dual SPST 213 provide interface between the external device and the signal processing unit 230.

When the DSP selection signal is activated, the first dual SPST 212 and the second dual SPST 213 provide interface between external device and image processing unit 220. Then, the mobile terminal works as a PC camera of the personal computer 200.

An operation of built-in camera as PC camera has been explained in accordance with the embodiment of the present invention. However, the switching function can be applied to various multimedia technologies of the mobile terminal.

For example, images taken by the built-in camera of the mobile terminal can be printed by a printer in accordance with the interface between the mobile terminal and the printer.

Images taken by the built-in camera of the mobile terminal can be stored in an external USB memory in accordance with the interface between the mobile terminal and the external USB memory.

A message input unit can be implemented by a key matrix encoder processor in the mobile terminal in accordance with the interface between the mobile terminal and the keyboard.

MP3 data of the mobile terminal can be transferred to the audio component through the USB port or the RSC232C and played in accordance with the interface between the mobile terminal and the audio component.

While the present invention has been shown and described with respect to the particular embodiments, it will be apparent to those skilled in the art that many changes and modifications may be made without departing from the spirit and scope of the invention as defined in the appended claims.

What is claimed is:

1. A mobile terminal having a switching function, comprising: a dual interface means connected to an external device through a communication line, configured to multi-switch data according to a microcontroller unit (MCU) selection signal and a digital signal processor (DSP) selection signal;

an image processing means configured to obtain external image data, digitalize the image data and output the digitalized data to the dual interface means;

a signal processing means configured to activate the MCU selection signal or the DSP selection signal, send the data to the external device through the dual interface means, receive the data from the external device through the dual interface means and processing the data; and a memory means configured to store or output the data according to control of the image processing means or the signal processing means, wherein the dual interface means includes:

a connector connected to the external device through the communication line, configured to provide an interface:

a first dual single pole single throw (SPST) connected to a first USB line of the communication line through the connector, configured to provide a data oath to the signal processing means when the MCU selection signal is activated and provide a data path to the image processing means when the DSP selection signal is activated, a second dual SPST connected to a second USB line of the communication line through the connector, configured to provide a data path to the signal processing means when the MCU selection signal is activated and provide a data path to the image processing means when the DSP selection signal is activated.

2. The mobile terminal as recited in claim 1, wherein the communication line is a USB line.

3. The mobile terminal as recited in claim 1, wherein the communication line is a RS232C data line.

4. The mobile terminal as recited in claim 1, wherein the image processing means includes:

a camera module for obtaining external image data and outputting the image data; and an image processor for receiving the image data, processing the image data, receiving the audio data, processing the audio data and outputting the processed data to the dual interface means.

5. The mobile terminal as recited in claim 1, wherein the signal processing includes:

a USB transceiver for receiving the data from the dual interface means, transforming the received data into a logic level signal, transferring the data to an MCU and transferring the data from the MCU to the dual interface means; and the MCU for receiving the data from the USB transceiver, transforming the data into the adequate format to a mobile terminal, receiving the data from the mobile terminal, transforming the data into the adequate format to the USB transceiver and activating the DSP selection signal and MCU selection signal.

6. The mobile terminal as recited in claim 1, wherein the external device is a personal computer.

7. The mobile terminal as recited in claim 1, wherein the external device is a printer.

8. The mobile terminal as recited in claim 1, wherein the external device is an external USB memory.

9. The mobile terminal as recited in claim 1, wherein the external device is a keyboard.

10. The mobile terminal as recited in claim 1, wherein the external device is an audio component.

* * * * *